United States Patent Office 2,770,252
Patented Nov. 13, 1956

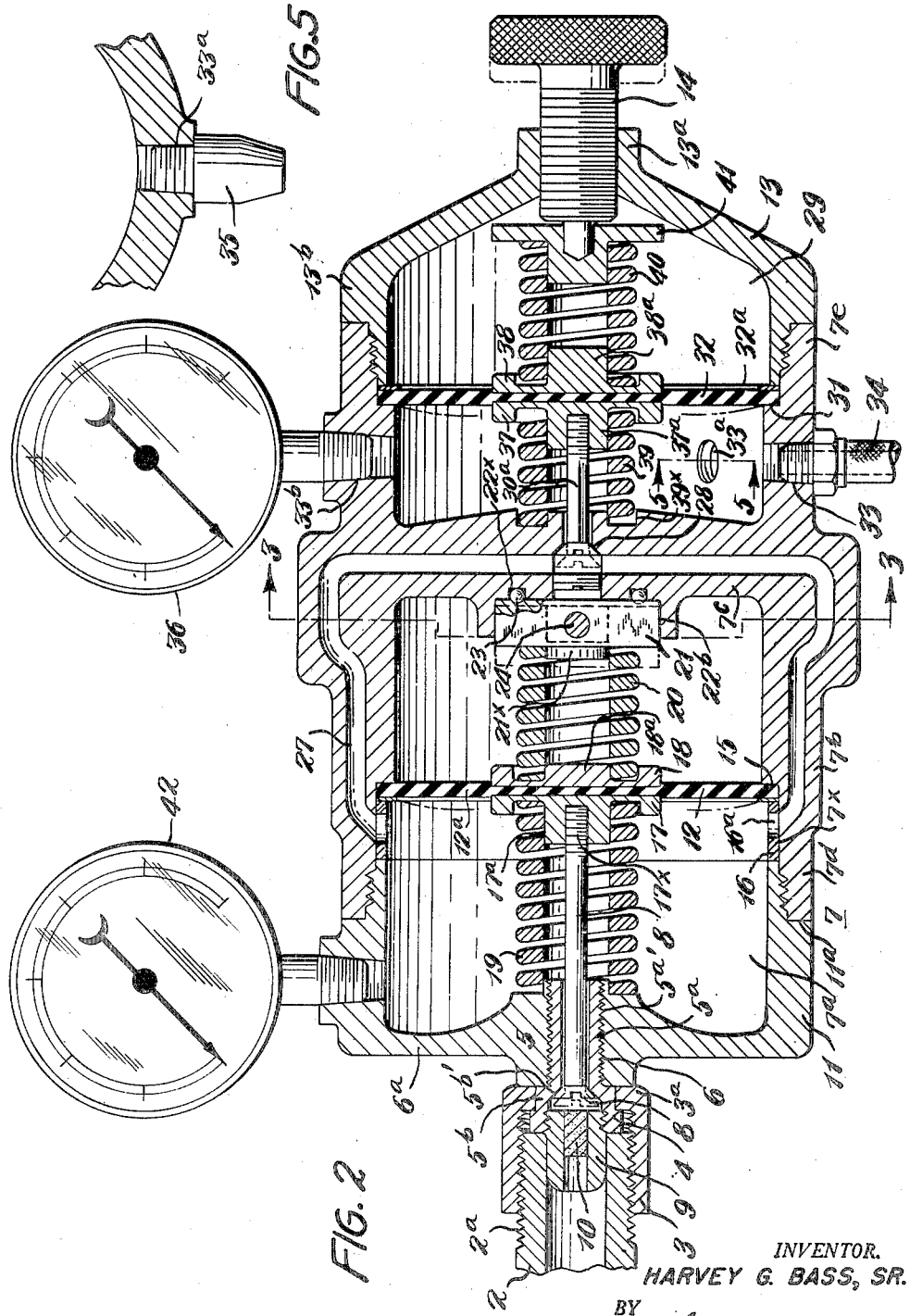

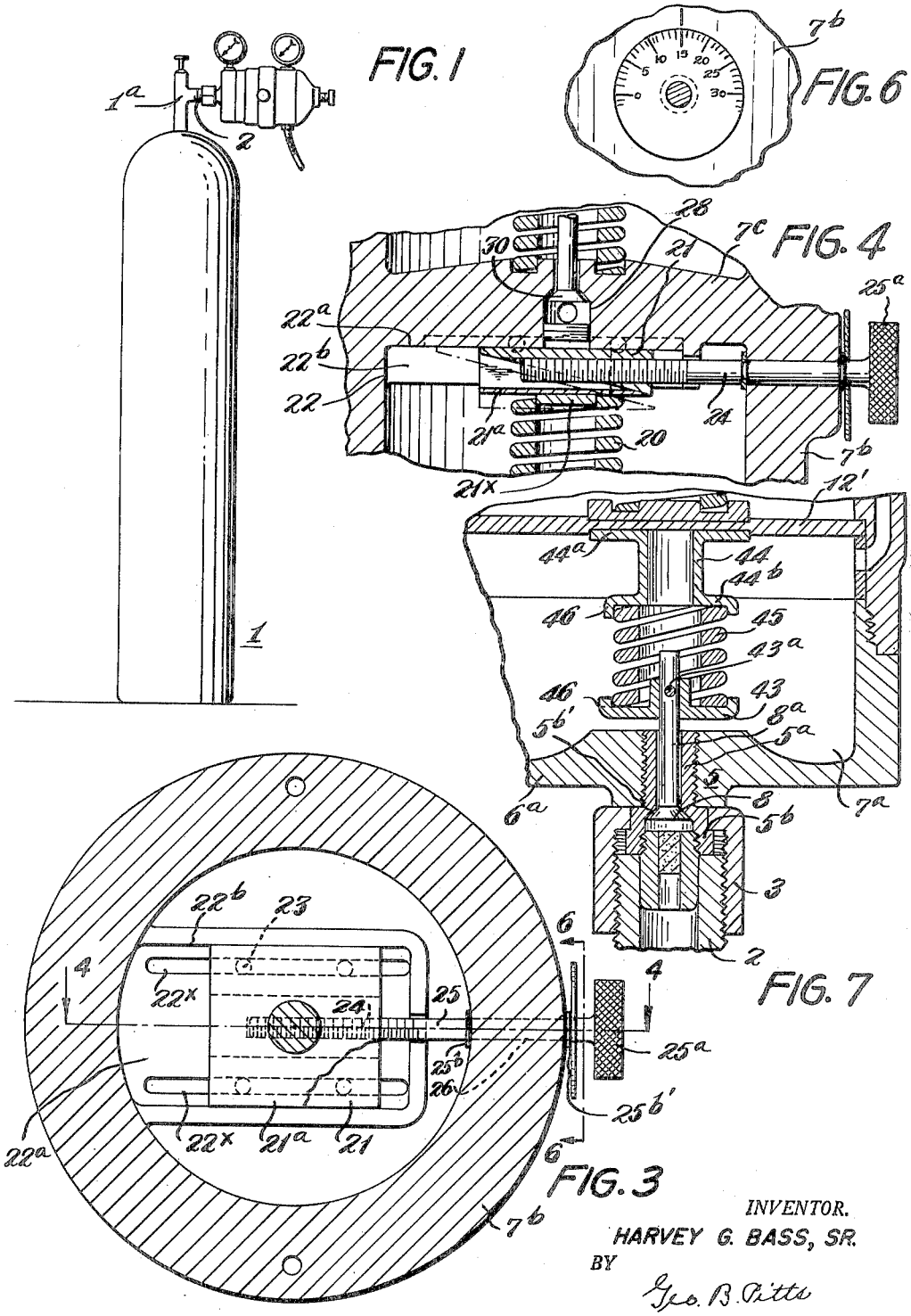

2,770,252

GAS PRESSURE REDUCTION REGULATOR

Harvey G. Bass, Sr., Shaker Heights, Ohio, assignor to Alice M. Bass, Shaker Heights, Ohio Application September 24, 1951, Serial No. 247,991

2 Claims. (Cl. 137—505.12)

This invention relates to a pressure reduction regulator for highly compressed gases supplied from cylinders, more particularly a unitary apparatus providing for a multi-stage gas pressure reduction.

Dependent on the results or type of operation sought to be carried out, various gases, including oxygen, hydrogen, helium, nitrogen, neon, argon, ozone, krypton and zenon, may be supplied to the regulator and discharged therefrom at a selected pressure. Where the gas supplied to and discharged from the regulator is oxygen, it is conducted to (a) a suitable torch for effecting industrial operations (for example, welding or cutting metal) or (b) a patient suffering from pneumonia or other condition requiring a supply of oxygen.

In all gas pressure regulators, of which I have knowledge, the highly compressed gas is supplied from a cylinder directly to the initial or first stage pressure reduction chamber wherein pressure reduction of the gas takes place. Due to the high pressure of the gas issuing from the cylinder, it attains a very high velocity; as a result, the pressure of the gas in the chamber is, for an instant (approximately one-twentieth of a second) reduced to substantially zero pressure and immediately is re-compressed to its supplied pressure the effect of which is to heat the gas to an elevated temperature. If the pressure chamber or the gas supplied thereto contains particles of foreign substances, such as moisture, fine metallic deposits or iron oxide, dirt and the like carried by the gas from the cylinder into the pressure chamber, and these particles are heated to their ignition temperature resulting from friction or heat due to recompression of the gas, and if the gas, such as oxygen, is capable of supporting combustion, an explosion will follow, thereby creating a dangerous condition to property and human life; in fact, records show that a large number of explosions of gas pressure regulators have heretofore occurred yearly. It is therefore highly important to provide a form of construction wherein such occurrences, as above referred to, are eliminated.

My invention, for illustrative purposes, is embodied in a unitary structure providing for a two-stage reduction of the gas pressure and includes an improved form of construction (a) for eliminating heat, due to re-compression of the supplied gas, inside the regulator by providing in the gas supply connection leading from the cylinder to the initial or high gas pressure chamber of the regulator, immediately outside of said chamber, a controlling valve, so that the gas under high pressure, as supplied to the initial pressure reduction chamber, may be controlled at selected pressures therewithin. In this form of construction and control of the high pressure gas, (a) the volumetric area of the connection between the cylinder and the controlling valve is materially reduced, so that generation of undue heat, due to recompression of the gas, is avoided and (b) the distance of travel of the high pressure gas from the cylinder to the controlling valve is materially reduced and of minimum length, whereby danger of generation of electrostatic electricity incident to magnetic and non-magnetic particles stored or accumulated in the cylinder (particles such as rust, moisture, dirt, metallic deposits) and capable of being carried along with the gas stream upon opening of the valve for the discharge fitting on the cylinder, is eliminated. Where the regulator is connected to a cylinder charged with oxygen at 2200 p. s. i., it is possible for the following reactions to occur upon opening of the discharge valve for the cylinder; first, the issuing oxygen dropping in pressure and temperature, if subjected to a charge of electrostatic electricity, would produce ozone. The percentage of ozone produced would depend upon the drop in temperature and strength of the charge of electrostatic electricity; the factors involving such eletrical charge would be the number of particles in the oxygen stream and strength of electrostatic field in the cylinder discharge valve. Second, the mixture of ozone and oxygen would almost instantly be re-compressed, the generated heat due to re-compression of the mixture would decompose the ozone and create an explosive force the degree of which would be in direct proportion to the amount of ozone present in the mixture. I have therefore discovered that by providing the point of pressure control or delivery of the oxygen to the pressure reduction chamber outside the latter and in close relation to the discharge valve for the cylinder, (I) the length of travel or flow of the oxygen is reduced so that danger of any particles in the oxygen stream being heated to their ignition temperature, due to friction of the moving particles or otherwise, is eliminated and (II) the volumetric area in the gas supply gland is materially limited to prevent generation of undue heat due to re-compression of the oxygen.

While gas pressure regulators embodying my invention have certain advantages in facilitating the reduction of the pressure of the gases above referred to and insuring discharge of the gas uniformly at desirable pressures, it is especially advantageous and attains new results where the gas supplied to the regulator is capable of supporting combustion.

One object of the invention is to provide an improved multi-stage pressure reduction regulator wherein generation of heat, due to re-compression of the gas, is eliminated in the regulator.

Another object of the invention is to provide an improved multi-stage pressure reduction regulator wherein the pressure of the gas in the initial reduction chamber is controlled exteriorly thereof and in close relation to the discharge valve of the cylinder, thereby limiting the area wherein re-compression of the supplied gas takes place, so that generation of undue heat is eliminated and distance of travel of the gas stream to the point of pressure control is reduced, whereby danger of generation of electrostatic electricity due to particles of foreign substances in the gas is materially reduced.

Another object of the invention is to provide an improved gas pressure regulator of the multi-stage reduction type, wherein provision is made to control the supply of gas to the initial gas pressure chamber, whereby the pressure of the gas in the latter may be selectively regulated.

Another object of the invention is to provide an improved gas pressure regulator wherein provision is made to control the pressure of the gas in advance of its supply into the initial gas pressure reduction chamber, whereby re-compression of the gas and danger of explosions in the chamber are eliminated.

Another object of the invention is to provide an improved gas pressure reduction regulator of the multi-stage type having manually actuated means for controlling the supply of gas to the initial gas pressure reduction chamber, whereby the gas in the latter may be maintained at a selected predetermined pressure.

Another object of the invention is to provide an improved gas pressure reduction regulator of the multi-stage reduction type, wherein a wall of the initial pressure reduction chamber is provided with an adjustable gas inlet valve arranged to be selectively positioned to control the gas pressure within the chamber.

Another object of the invention is to provide an improved gas pressure regulator of the multi-stage type wherein one wall of the initial pressure reduction chamber is formed with a gas inlet opening adapted to be connected with a gland leading from the gas charged cylinder, a controlling valve is mounted in the opening and means operable through a spring biased diaphragm, serve to selectively adjust the valve to provide a predetermined gas pressure within the chamber.

Another object of the invention is to provide an improved gas pressure reduction regulator consisting of a casing having separate compartments enclosing diaphragms, respectively, to provide initial and second reduction chambers and a gas flow connection between the latter, one wall of the initial pressure reduction chamber being formed with a gas inlet opening adapted to be connected with a cylinder charged with gas under high pressure, a valve in said opening for controlling the supply of gas to the initial pressure reduction chamber, means within the compartment for the latter chamber and operable through the diaphragm therein to adjust the valve to selectively regulate the gas pressure in the initial pressure reduction chamber and means exterior of the latter chamber for operating the valve adjusting means.

Another object of the invention is to provide an improved gas pressure regulator of the multi-stage type, wherein the initial pressure reduction chamber is provided with a diaphragm interposed between compression springs and connected at one side to the valve element of the gas inlet valve disposed exteriorly of the chamber and means engaging with and operable through the spring at the opposite side of the diaphragm for flexing the diaphragm to selectively adjust the valve element in open position, whereby the supply of the gas to the initial pressure reduction chamber may be controlled.

A further object of the invention is to provide an improved gas pressure regulator comprising few parts and capable of ready assembly.

Other objects of the invention will be apparent to those skilled in the art to which my invention relates from the following description taken in connection with the accompanying drawings, wherein Fig. 1 is an elevational view showing a gas pressure regulator embodying my invention connected to the valved outlet of a cylinder charged with gas under pressure;

Fig. 2 is a sectional view of the regulator, enlarged.

Fig. 3 is a section on the line 3—3 of Fig. 2.

Fig. 4 is a fragmentary section on the line 4—4 of Fig. 3;

Fig. 5 is a fragmentary section on the line 5—5 of Fig. 2;

Fig. 6 is a section on the line 6—6 of Fig. 3;

Fig. 7 illustrates a modified form of construction.

In the drawings, referring to Figs. 1 to 5, inclusive, 1 indicates as an entirety a cylinder charged with a suitable gas. As my invention is particularly adapted to prevent explosions where gas supplied to the regulator is capable of supporting combustion, I will herein refer to the use of oxygen; but such reference is not intended by me to be limiting of the scope of the invention. According to commercial practice the cylinder 1, when delivered to a user, is filled with the gas compressed to a pressure of 2200 to 2500 pounds per square inch. The cylinder 1 is provided with a valve controlled discharge fitting 1a having a gland 2, the outer end portion of which is provided exteriorly with screw threads 2a engaged by the screw threads provided interiorly of a coupling 3, which, as later set forth, rigidly connects the cylinder 1 to the regulator, whereby the gas in the cylinder may be supplied to the latter (see Fig. 2). The rear end of the coupling 3 is provided with an inturned annular wall 3a which engages a collar 4 on the outer end of a hollow fitting 5. The fitting 5 consists of an elongated inner section 5a of tubular shape in cross section and an enlarged outer annular section 5b. The inner section 5a is provided exteriorly with screw threads 5a' and extends into and has screw threaded engagement with the walls of a through opening 6 formed in the adjacent end wall 6a of the regulator, indicated as an entirety at 7. By preference, the section 5a is threaded into the opening 6 far enough to tighten the outer section 5b rigidly against the end wall 6a, or the boss thereon surrounding the opening 6. As shown, the bottom of the section 5b is ground to provide a seat 5b' for a valve element 8 having a shank 8a extending through the section 5a for a purpose later set forth. The diameter of the shank 8a is less than that of the opening through the inner section 5a, to provide a passageway through which the gas flows to the initial pressure reduction chamber 7a of the regulator 7; also, the outer section 5b is enlarged outwardly of the valve seat 5b', so that when the valve element 8 is in its unseated position, as shown in dotted lines in Fig. 2, the supplied gas may flow past the valve element to the passageway extending through the section 5a. The inner wall of the enlarged section 5b outwardly of the valve seat 5b' is provided with screw threads which engage the screw threads on the inner end of a nipple 9. The nipple 9 extends into the discharge end portion of the gland 2. It will be noted (a) that where the coupling 3 is tightened into final position, the opposed ends of the gland 2 and section 5b are secured together in rigid, endwise relation, whereby the regulator 7 is connected to and supported on the cylinder and (b) that by loosening and disengaging the coupling 3 from the gland 2 the cylinder 1 and regulator 7 may be separated, thereby providing for the connection of a gas charged cylinder to the regulator when one cylinder becomes exhausted or the pressure therein is reduced too low for use.

10 indicates a filter preferably formed of a section of porous bronze. The filter 10 is mounted in the nipple 9 and has a cross section complementary to the inner wall of the nipple and preferably has a press-fit engagement with the latter wall. The filter 10 serves to prevent foreign matter from being carried with the gas to the chamber 7a.

From the foregoing description it will be observed that the valve, which controls the supply of gas to the initial pressure reduction chamber 7a, is located outside the latter and being disposed at the inner end of the gland 2 the travel distance for the gas issuing from the cylinder fitting 1a to the point of control is of minimum length and the space wherein re-compression of the gas takes place is materially restricted so that undue temperature conditions resulting from re-compression are avoided, re-compression of the gas is not effected in the chamber 7a and danger of generation of electrostatic electricity or heating of foreign particles to a point of ignition is eliminated.

Furthermore, by locating the controlling valve exteriorly of the chamber 7a, the valve may be selectively pre-set, as later set forth, whereby the gas supplied into the chamber 7a will be at a predetermined reduced pressure. The pre-setting or adjustment of the valve element 8 is effected by mechanism later referred to.

The regulator 7 consists of the following: 7b indicates a main or central casing member preferably of annular shape in cross section and provided intermediate its opposite ends with a transverse wall 7c. The opposite open ends of the casing member 7b terminate in rims 7d, 7e, each provided with screw threads (these threads being preferably on the inner side of each rim). 11 indicates a cup-shaped casing member the side wall of which adjacent its open end is reduced and provided exteriorly with screw threads engaging the screw threads on the rim 7d, to mount the member 11 on the member 7b. As shown, the bottom wall of the casing member 11 forms the end wall 6a of the regulator through which the inner section 5a extends, as already set forth. The reduced side wall of the casing member 11 provides an annular shoulder 11a, which engages the circumferential end of the rim 7d when the member 11 is tightened in position. As shown, the cup-shaped casing member 11 co-operates with the casing member 7b and a diaphragm 12 to form the initial pressure reduction chamber 7a. 13 indicates a bonnet the end wall of which is preferably of conical shape and terminates in an axially disposed hollow boss 13a the inner wall of which is provided with screw threads to adjustably support a screw 14, for a purpose later to be described. The side wall 13b of the bonnet is connected to and mounted on the rim 7e similarly to the connection and mounting of the side wall of the cup-shaped member 11. The inner wall of the initial pressure chamber 7a, inwardly of the rim 7d is reduced circumferentially, as shown at 7x, to provide an annular shoulder 15, which forms a seat for the marginal edge portion of the diaphragm 12. The outer side of the diaphragm 12 is engaged by a suitable gasket 12a and the latter is secured against the diaphragm by an annular band 16 having a pressed-in fit with the wall 7x of the casing member 7b. As shown, the end of the side wall of the member 11 is arranged to engage the band 16 and secure it in engagement with the gasket 12a. 17, 18, indicate disks disposed axially of and suitably secured to the opposite faces of the diaphragm 12. The diaphragm 12 is formed of flexible material (such as rubber or a rubber compound) and by preference, the disks are molded therein. The outer sides of the disks 17, 18, are provided with bosses 17a, 18a, respectively, which provide seats for the inner ends of axially related coiled compression springs 19, 20, respectively. The boss 17a is formed with an inwardly extending opening 17x, the wall of which is provided with screw threads to receive the screw threaded end portion of the valve shank 8a, whereby the latter is connected to the diaphragm 12, such connection, in the form of construction shown in Fig. 2, serving to operate the valve element 8 into open position when the diaphragm is flexed (see dotted lines in Fig. 2), as later set forth and to seat the valve element when the pressure in the chamber 7a exceeds that for which the valve is set. The spring 19 is interposed between the diaphragm 12 and the end wall 6a of the initial pressure chamber 7a; the wall 6a surrounding the opening 6 therein is provided with a hollow boss which provides a seat for the adjacent or outer end of the spring 19. The spring 20 is interposed between the diaphragm 12 and a pair of relatively movable, inner and outer cam elements 21, 21a, the opposed faces of which are in sliding engagement and reversely inclined. The inner cam element 21 is slidably supported on the adjacent side of the transverse wall 7c, as later set forth, on an axis extending diagonally of the member 7b, whereas the outer side or face of the cam element 21a is provided with a boss 21x which extends into the convolution at the adjacent end of the spring 20 to support the latter and provide a connection between the spring and the element 21a to prevent lateral movement or displacement of the latter during movement of the cam element 21. The cam element 21 is slidably supported in an elongated recess 22 formed in the wall 7c and consisting of a bottom wall 22a and side walls 22b. The bottom wall 22a is formed with elongated grooves 22x disposed parallel to and at opposite sides of the axis on which the element 21 moves. A plurality of balls 23 (serving as anti-friction elements) are disposed between the bottoms of the grooves and the cam element 21 to facilitate operation or adjustment of the latter endwise of the recess 22, each ball 23 being seated in a spherical shaped recess formed in the opposed wall of the element 21 and arranged to roll endwise of the adjacent groove 22x. The cam element 21 is formed with a screw threaded opening 24 disposed parallel to the axis on which it slides, the threads therein being engaged by the screw threaded portion of a rotatable rod 25. The rod 25 extends outwardly and has bearing in a through opening 26 formed in the side wall of the casing member 7b, the outer end of the rod 25 terminating in a suitable device 25a to facilitate manual rotation thereof. The rod 25 is provided with collars 25b, 25b', which respectively engage the inner and outer walls of the casing member 7b to prevent endwise movement of the rod when it is rotated, to operate the cam element 21 in either direction. The collars 25b, 25b', are preferably fixed to the rod 25 whereas the collar 25b' is preferably enlarged circumferentially and provided on its outer face with micrometer graduations movable relative to an index mark on the wall 7b, whereby the degree of angular movement of the rod 25 and movement of the cam element 21 can be visibly determined.

As shown, in Figs. 2, 3 and 4, the springs 19 and 20 and diaphragm 12 are in normal position (that is, neither spring is compressed) and the valve element 8 is seated or in closed position. To adjust the valve element to a selected position, dependent on the gas pressure to be maintained in the initial pressure chamber 7a, as shown in dotted lines in Fig. 2, the cam element 21 is moved toward the left as viewed in Figs. 3 and 4, the effect of which is to move the cam element 21a outwardly (see dotted lines in Figs. 2 and 4) and the latter in turn compresses the spring 20 to flex the diaphragm 12 in opposition to the tension of the spring 19. As the spring 20 is stronger than the spring 19, the diaphragm 12 is held in its flexed position and as the diaphragm is connected to the shank 8a of the valve element 8, it operates to unseat the valve and hold it in open position, whereby the gas is supplied to the chamber 7a at the predetermined selected pressure.

The initial pressure reduction chamber 7a is connected by a conduit or duct 27, preferably a plurality of conduits or ducts, the discharge ends of which are connected to a valve controlled inlet opening 28 for the second pressure reduction chamber 29. As shown in Fig. 2, the conduits 27 are formed in the side walls and transverse wall 7c of the casing member 7b and the inlet opening 28 is formed axially of and in that portion of the wall 7c between the conduits 27 and chamber 29, the inlet end of the opening 28 being annularly enlarged to form a seat for a valve element 30. As the gasket retaining band 16 is positioned between the diaphragm 12 and the circumferential end of the side wall of the member 11, the band 16 is provided with openings 16a arranged to register with the inlets of the conduits 27.

The rim 7e is reduced to provide an annular shoulder 31, which forms the seat for the marginal edge portion of a flexible diaphragm 32. The outer side of the diaphragm 32 is engaged by a suitable gasket 32a and the latter is secured in position against the diaphragm by the circumferential end wall of the bonnet 13. As will be observed in Fig. 2, the diaphragm 32, transverse wall 7c and the adjacent side walls 7' of the casing member 7b form the second stage pressure reduction chamber 29. The side wall 7' is formed with a plurality of screw threaded openings 33, 33a and 33b. The opening 33 is suitably detachably connected to a discharge pipe 34 (preferably formed of flexible material), the outer end of which is provided with a torch (not shown) or other device dependent on the intended use of the gas, the opening 33a supports the inlet nipple of a suitable adjustable pressure relief valve 35 (see Fig. 5), whereas the opening 33b supports the inlet nipple of a suitable pressure gage 36. Where the gas is to be used for welding or other industrial applications the gage is graduated to indicate pressure in pounds; where the gas is to be used for medicinal applications the gage is graduated to indicate liters.

The gas pressure in the chamber 29 is controlled by the following instrumentalities; 37, 38, indicate disks disposed axially of and suitably secured to the opposite faces of the diaphragm 32. The diaphragm 32 is formed of flexible material (such as rubber or rubber compound) and by preference the disks are molded therein. The outer sides of the disks 37, 38, are provided with bosses 37a, 38a, respectively, which provide seats for the inner ends of axially related coiled compression springs 39, 40, respectively. The spring 39 is interposed between the diaphragm 32 and the wall 7c, the wall 7c surrounding the opening 28 therein being formed with an annular recess 39x in which the adjacent end of the spring 39 is seated. The spring 40 is interposed between the diaphragm 32 and a collar 41 suitably mounted on the inner end of the adjusting screw 14. As shown, the valve element 30 is provided with a shank 30a, which extends through the opening 28, its outer end portion being provided with screw threads and mounted in a screw threaded opening formed in the boss 37a. The parts above referred to are shown in Fig. 2 in normal position; that is, the valve element 30 is seated to close the inlet opening 28 and the springs 39, 40, are not compressed or under tension. By adjusting the valve 30 to a selected open position, any desired pressure of the gas may be maintained in the pressure reduction chamber 29 for providing for a uniform discharge of the gas through the pipe or hose 34. The adjustment of the valve element 30 is effected by operation of the adjusting screw 14 to compress the spring 40 and flex the diaphragm 32, which in turn operates the valve element 30 to the selected position and also compresses spring 39. In the event the pressure of the gas supplied through the conduits 27 at any time exceeds the tension of the spring 39, the valve element will close the opening 28, but as the spring 40 is stronger than that of the spring 39, the diaphragm will be maintained in substantially its flexed position, but when the gas pressure becomes reduced, the spring 39 will operate to restore the valve element 30 to its adjusted position.

42 indicates a suitable gage preferably mounted in the side wall of the cup-shaped member 11 and connected to the chamber 7a to indicate the pressure therein.

Operation: for carrying out a welding or metal cutting operation the following preliminary steps are carried out; the cylinder 1 is connected to the gas supply connection by connecting gland 2 and coupling 3 together, the valve for cylinder fitting 1a being closed; next, the valve on the torch is closed. The screw 14 is backed up to relieve tension on springs 39, 40, and whereby diaphragm 32 is moved to normal or non-flexed position and valve element 30 is seated to close the gas inlet 28; with these parts in the position indicated the hand 36a of gage 36 points to zero, as shown; next, the rod 25 is rotated to move cam element 21 toward the right, as viewed in Fig. 3, which relieves tension on the springs 19, 20, so the diaphragm 12 assumes a non-flexed position and moves valve element 8 into seating position to close the gas supply opening leading to the initial pressure reduction chamber 7a; with the foregoing parts in the position indicated, the hand 42a of gage 42 points to zero. Now assuming, for example, an operation is to be carried out requiring a uniform supply of gas to the torch at 15 pounds pressure per square inch, which pressure is to be maintained in the second pressure reduction chamber 29 and a pressure of one hundred and twenty-five pounds per square inch is to be maintained in the initial pressure reduction chamber 7a, the following steps are carried out; first, the valve in fitting 1a is opened, next the rod 25 is rotated to move the cam element 21 toward the left, as viewed in Fig. 3, which operation serves to put the springs 19, 20, under tension and to flex the diaphragm 12, as shown in Fig. 2, and unseat the valve element 8, movement of the cam element being continued until the hand 42a of the gage 42 points to graduation marked "125," and providing an inlet opening between the valve element and its seat of approximately .0035 of an inch; finally the screw 14 is threaded inwardly to put the springs 39, 40, under tension and flex the diaphragm 32, thereby moving the valve element 28 to open position, such operation being continued until the hand 36a points to graduation marked "15" and providing an inlet opening between the valve element 28 and its seat of approximately one thirty-second of an inch. With gas supply to chambers 7a, 29, provided for, the valve for the torch may be opened and the gases ignited. From the description herein it will be understood that if the gas pressure in chamber 7a exceeds 125 p. s. i., the diaphragm will be flexed to seat the valve element 8; likewise, where the pressure in the chamber 29 exceeds 14 p. s. i., (for example, where work is stopped and valve at torch is closed) the diaphragm 32 will flex and seat valve element 28. Accordingly, it will be observed that while the valve elements 8 and 28 may be pre-set to control the gas pressures in the chambers 7a, 29, respectively, they automatically seat and open to the pre-set positions to compensate for variations in pressure in the adjacent respective chambers.

Fig. 7 illustrates a modified form of construction, wherein the connection between the flexible diaphragm 12' and valve element 8 consists of relatively movable parts and provides for seating of the valve element substantially independently of the diaphragm. In the form of construction shown in Fig. 2, the valve element is rigidly connected to the diaphragm 12, so that excess pressure in the initial pressure reduction chamber 7a flexes the diaphragm 12 inwardly and through the shank 8a serves to seat the valve element 8. While this operation may be carried out in the form of construction shown in Fig. 7, where excess pressure develops in the initial pressure reduction chamber 7a, the relatively movable parts, which includes a compression spring, in this form of construction provides for seating of the valve element where the pressure of the supplied gas from the cylinder 1 on the valve element 8 exceeds the tension of the spring. Referring particularly to Fig. 7, the gland 2 is rigidly connected through the coupling 3 to the fitting 5 the outer section 5b of which provides a seat 5b' for a valve element 8 and the inner section 5a of the fitting extends through an opening in the end wall 6a of the initial pressure reduction chamber 7a. The parts forming the connection between the valve element 8 and the diaphragm 12' consist of the following: 8a' indicates the shank for the valve element 8 extending inwardly through the inner section 5a of the fitting 5 and through a collar 43 to which the shank is connected by a pin 43a. 44 indicates a tubular member axially related to the shank 8a' and having at its inner end a flange 44a preferably molded in the material forming the diaphragm 12'. The outer end of the tubular member 44 terminates in a collar 44b. 45 indicates a coiled compression spring the opposite ends of which are seated on the opposed faces of the collars 43, 44b. Both collars are preferably provided with inwardly extending side walls 46 arranged to engage the terminating spring convolutions, which are preferably spot welded to the collars. In operation, it will be understood that the diaphragm 12' is flexed outwardly by the cam elements 21, 21a, the flexing of the diaphragm operating through the springs 20 and 45 to unseat the valve element 8 a predetermined distance, dependent on the adjustment of the cam 21.

Due to the fact that the gas, following its re-compression, has a high pressure the springs 20 in both forms of construction and the spring 45 in the modified form must be strong enough to flex the diaphragm and maintain the valve element 8 in its adjusted open position, but yield and permit closing of the valve element when the supplied gas has an excess pressure. As already set forth in connection with Fig. 2, the adjustment of the valve element 8 in Fig. 7 to a pre-set position serves to control the pressure of the gas in the chamber 7a.

To those skilled in the art to which my invention relates, many changes in construction and widely differing embodiments and applications of the invention will suggest themselves without departing from the spirit and scope of the invention. My disclosures and the descrip-

What I claim is:

1. A mulit-stage gas pressure reduction regulator comprising a unitary body provided with an intermediate transverse wall forming therewithin an initial chamber and a second chamber, said second chamber being provided with a gas discharge outlet, a flexible diaphragm mounted transversely within each of said chambers, said casing body and said transverse wall being formed with a duct through which gas may flow from said initial chamber to said second chamber, said transverse wall having a valve opening between said duct and said second chamber, valve means for said valve opening, said valve means being connected to the diaphragm in said second chamber, the wall of said initial chamber that is opposite to said last-named valve opening having an inlet opening with a valve seat, a valve therefor operatively connected to the diaphragm in said initial chamber, spring means effective through the diaphragm in said initial chamber for normally biasing said inlet valve towards its closed position, means between said transverse wall and the diaphragm in said initial chamber for flexing said diaphragm in opposition to said spring means and having manipulating means therefor extending to the outside of said initial chamber, said diaphragm-flexing means being slidably mounted upon said transverse wall.

2. A multi-stage gas pressure reduction regulator comprising a unitary body provided with an intermediate transverse wall forming therewithin an initial chamber and a second chamber, said second chamber being provided with a gas discharge outlet, a flexible diaphragm mounted transversely within each of said chambers, said casing body and said transverse wall being formed with a duct through which gas may flow from said initial chamber to said second chamber, said transverse wall having a valve opening between said duct and said second chamber, valve means for said valve opening, said valve means being connected to the diaphragm in said second chamber, the wall of said initial chamber that is opposite to said last-named valve opening having an inlet opening with a valve seat, a valve therefor operatively connected to the diaphragm in said initial chamber, spring means effective through the diaphragm in said initial chamber for normally biasing said inlet valve towards its closed position, means between said transverse wall and the diaphragm in said initial chamber for flexing said diaphragm in opposition to said spring means and having manipulating means therefor extending to the outside of said initial chamber, said diaphragm-flexing means including cam means that is positioned upon said transverse wall for slidable adjustment transversely of said casing body.

References Cited in the file of this patent

UNITED STATES PATENTS

| Number | Name | Date |
|---|---|---|
| 255,338 | Salomon | Mar. 21, 1882 |
| 1,107,849 | Schoen | Aug. 18, 1914 |
| 1,842,236 | Bastian | Sept. 7, 1929 |
| 1,883,690 | Gilgenberg | Oct. 18, 1932 |
| 1,912,383 | Pardee | June 6, 1933 |
| 2,057,133 | Bryce et al. | Oct. 13, 1936 |
| 2,057,150 | Kehl et al. | Oct. 13, 1936 |
| 2,195,728 | Jones et al. | Apr. 2, 1940 |
| 2,220,229 | Grove | Nov. 5, 1940 |
| 2,521,166 | Hinricks | Sept. 5, 1950 |
| 2,524,231 | Mott | Oct. 3, 1950 |